(12) United States Patent
Boland et al.

(10) Patent No.: US 8,479,349 B2
(45) Date of Patent: Jul. 9, 2013

(54) VEHICLE PROVIDED WITH AT LEAST TWO WINDSCREEN WIPER DEVICES

(75) Inventors: Xavier Boland, Arlon (BE); Pierre Henin, Bellefontaine (BE); Dieter Desaedelaere, Chassepierre (BE)

(73) Assignee: Federal-Mogul S.A., Aubunge (BE)

( * ) Notice: Subject to any disclaimer, the term of this patent is extended or adjusted under 35 U.S.C. 154(b) by 1054 days.

(21) Appl. No.: 11/816,368

(22) PCT Filed: Feb. 6, 2006

(86) PCT No.: PCT/EP2006/050683
§ 371 (c)(1),
(2), (4) Date: Feb. 9, 2009

(87) PCT Pub. No.: WO2006/087271
PCT Pub. Date: Aug. 24, 2006

(65) Prior Publication Data
US 2011/0094050 A1    Apr. 28, 2011

(30) Foreign Application Priority Data
Feb. 17, 2005    (EP) .................................... 05101203

(51) Int. Cl.
*B60S 1/38*    (2006.01)
*B60S 1/40*    (2006.01)
*B60S 1/34*    (2006.01)

(52) U.S. Cl.
USPC ................................. 15/250.32; 15/250.351

(58) Field of Classification Search
USPC ............. 15/250.32, 250.43, 250.44, 250.351, 15/250.001
See application file for complete search history.

(56) References Cited

U.S. PATENT DOCUMENTS

| 4,014,061 | A | * | 3/1977 | Jurowski et al. | ........... 15/250.43 |
| 5,182,831 | A | * | 2/1993 | Knight | ........................ 15/250.32 |
| 6,266,843 | B1 | * | 7/2001 | Doman et al. | ........... 15/250.201 |
| 7,305,734 | B2 | * | 12/2007 | Boland et al. | ............ 15/250.32 |
| 2004/0111820 | A1 | * | 6/2004 | Aoyama et al. | .......... 15/250.201 |
| 2005/0177970 | A1 | * | 8/2005 | Scholl et al. | ................ 15/250.32 |
| 2008/0263810 | A1 | * | 10/2008 | De Block et al. | .......... 15/250.32 |

FOREIGN PATENT DOCUMENTS
DE          2930680     *   2/1981
WO   WO2004028875     *   4/2004

OTHER PUBLICATIONS
Machine Translation of Description portion of DE2930680, patented Feb. 1981.*

* cited by examiner

*Primary Examiner* — Gary Graham
(74) *Attorney, Agent, or Firm* — Robert L. Stearns; Dickinson Wright, PLLC

(57) ABSTRACT

A vehicle provided with at least two windscreen wiper devices each comprising an elastic, elongated carrier element, as well as an elongated wiper blade of a flexible material, which can be placed in abutment with a windscreen of the vehicle to be wiped, each wiper blade including opposing longitudinal grooves on its longitudinal sides, in which grooves spaced-apart longitudinal strips of the carrier element are disposed, wherein neighboring ends of longitudinal strips are interconnected by a respective connecting piece, which windscreen wiper devices each comprise a connecting device for a respective oscillating arm, with the interposition of a joint part, with the special feature that each joint part and its corresponding oscillating arm comprise mutually cooperating protrusion/recess means resulting in an asymmetric form of joint part and of oscillating arm with the respect to their respective middle longitudinal planes, seen in vertical direction.

7 Claims, 5 Drawing Sheets

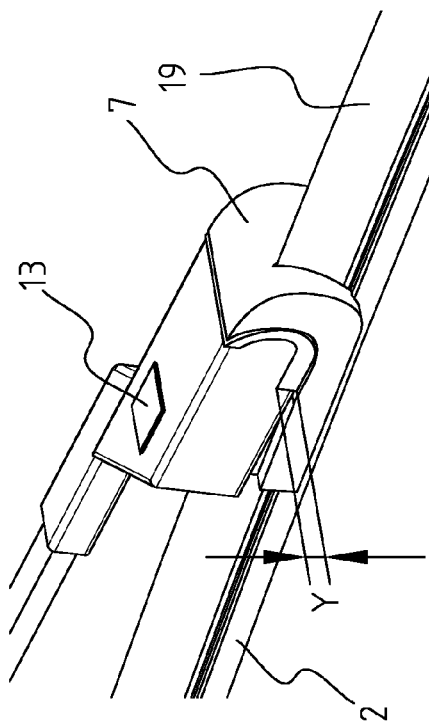
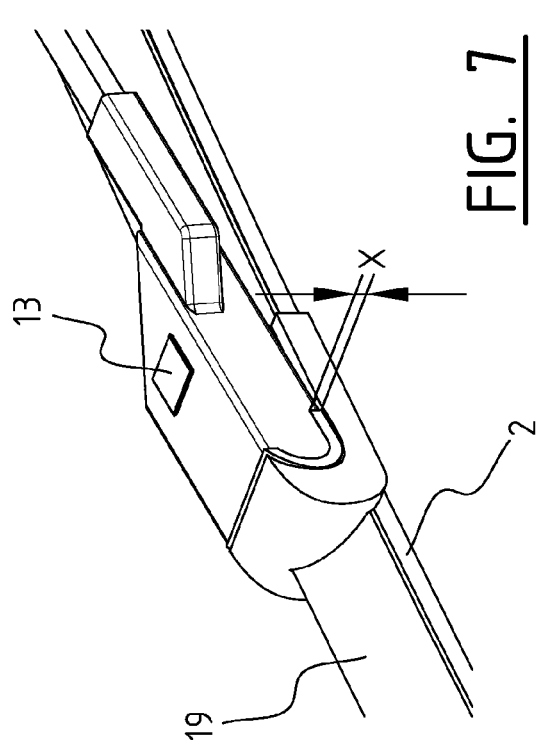
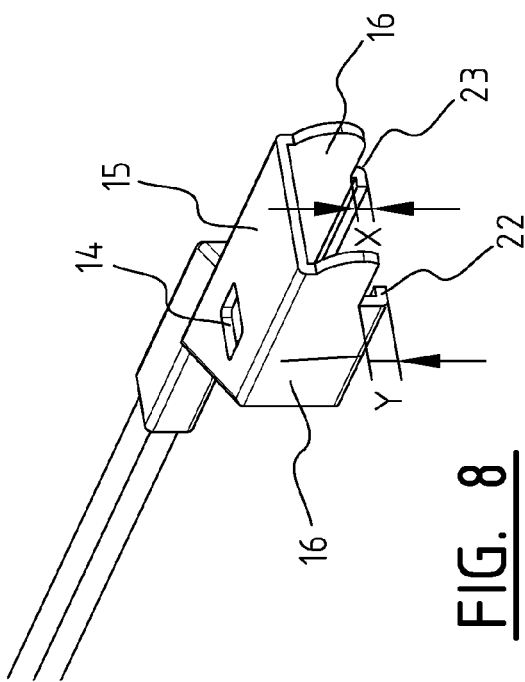
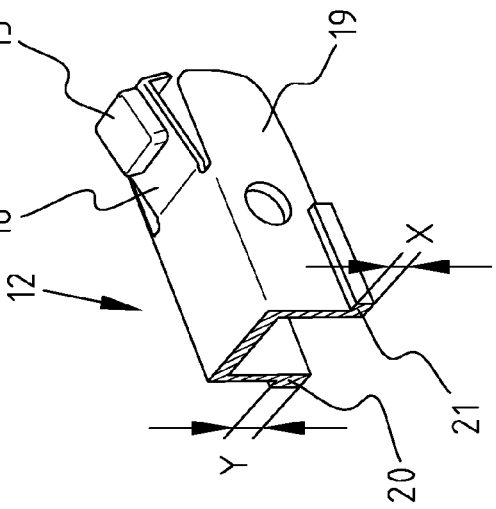

US 8,479,349 B2

VEHICLE PROVIDED WITH AT LEAST TWO WINDSCREEN WIPER DEVICES

BACKGROUND OF THE INVENTION

1. Technical Field

The invention relates to a vehicle provided with at least two windscreen wiper devices each comprising an elastic, elongated carrier element, as well as an elongated wiper blade of a flexible material, which can be placed in abutment with a windscreen of the vehicle to be wiped, each wiper blade including opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper devices each comprise a connecting device for a respective oscillating arm, wherein each oscillating arm is pivotally connected to its corresponding connecting device about a pivot axis near one end, with the interposition of a joint part, wherein each joint part comprises at least one resilient tongue engaging in a correspondingly shaped hole provided in its corresponding oscillating arm, and wherein said resilient tongue is rotatable along a hinge axis between an outward position retaining a wiper blade onto its corresponding oscillating arm and an inward position releasing said wiper blade from its corresponding oscillating arm.

2. Related Art

Such vehicle with such a windscreen wiper device is known from European patent publication no. 1 403 156 of the same Applicant. This prior art windscreen wiper device is designed as a "yokeless" wiper device, wherein no use is made of several yokes pivotally connected to each other, but wherein the wiper blade is biased by the carrier element, as a result of which it exhibits a specific curvature. In order to connect the wiper blade onto the oscillating arm, said resilient tongue is initially pushed in against a spring force—as if it were a push button—and then allowed to spring back into the hole provided in said oscillating arm, thus snapping, that is clipping the resilient tongue into the hole. By subsequently pushing in again said resilient tongue against the spring force, the wiper blade may be released from the oscillating arm.

Such a known vehicle is often equipped with a so-called "butterfly" wiper arrangement on the front side thereof. In such arrangement two oscillating arms are each pivotally connected to a mounting head fixed for rotation to a shaft driven by a small motor, wherein in use the one shaft rotates alternately in a counterclockwise and in a clockwise sense (this shaft corresponds to the oscillating arm at the drivers side of the vehicle), whereas the other shaft simultaneously rotates alternately in a clockwise and in a counterclockwise sense (this shaft corresponds to the oscillating arm at the passengers side of the vehicle). In use both shafts carry the mounting heads into rotation also, which in turn draw the oscillating arms into rotation and by means of the connecting devices move the wiper blades accordingly. In practice it has become apparent that, during replacement of windscreen wiper devices known from the above European patent publication and used in a vehicle with the above-described "butterfly" wiper arrangement, such a windscreen wiper device meant to be mounted on the oscillating arm at the drivers side of the vehicle is actually mounted on the oscillating arm at the passengers side of the vehicle, while such a windscreen wiper device meant to be mounted on the oscillating arm at the passenger side of the vehicle is actually mounted on the oscillating arm at the drivers side of the vehicle.

Particularly when these windscreen wiper devices are equipped with spoilers (so-called "air-deflectors") such a reversed mounting of these windscreen wiper devices seriously affect the wiping qualities thereof particularly at high speeds, with all negative consequences involved.

SUMMARY OF THE INVENTION

The object of the invention is to provide a vehicle, particularly an automobile, with a windscreen wiper device of the "yokeless blade" type having a spoiler (or "air-deflector"), wherein it is no longer possible to mount a windscreen wiper device meant for the oscillating arm at the passenger side of the automobile on the oscillating arm at the drivers side of the automobile, and vive versa (that is to mount a windscreen wiper device meant for the oscillating arm at the drivers side of the automobile on the oscillating arm at the passengers side of the automobile).

In order to accomplish that objective, a vehicle of the type referred to in the introduction is characterized according to the invention in that each joint part and its corresponding oscillating arm comprise mutually cooperating protrusion/recess means resulting in an asymmetric form of joint part and of oscillating arm with respect to their respective middle longitudinal planes, seen in vertical direction, in order to ensure that each windscreen wiper device can only be mounted on its corresponding oscillating arm. In other words, due to the a symmetric form of both the joint part and its corresponding oscillating arm, it is prevented that the windscreen wiper device meant for the oscillating arm at the passenger side of the automobile can be mounted on the oscillating arm at the drivers side of the automobile, and that the windscreen wiper device meant for the oscillating arm at the drivers side of the automobile can be mounted on the oscillating arm at the passengers side of the automobile. By avoiding any such reverse mounting of these windscreen wiper devices the spoilers or "airdeflectors" provided thereon will always be in the right position, so that the wiping qualities will be guaranteed at all times.

It is noted that the present invention is not restricted to a vehicle, such as an automobile, having a so-called "butterfly" wiper arrangement on the front side thereof, as explained above. On the contrary, this invention also extends to other wiper arrangements, for example a normal "tandem" wiper arrangement. In the latter case the wiper blades on the drivers side and passengers side may mutually differ as far as the curvature of the carrier element (that is the longitudinal strips or "flexors") is concerned. A reverse mounting of both blades would then result in a situation, wherein the wiper blade on the drivers side is pressed too much on the windscreen to be wiped and the wiper blade on the passengers side is pressed too little on the windscreen to be wiped, or vice versa. Such a situation is of course undesirable, as the wiping qualities would then be seriously affected.

In a preferred embodiment of a vehicle in accordance with the invention at least one joint part comprises at least one laterally extending protrusion cooperating with a recess provided in its corresponding oscillating arm. Particularly, joint part has an at least substantially U-shaped cross-section at the location of its attachment to its corresponding connecting device, wherein joint part in a leg of U-shaped cross-section is provided with laterally extending protrusion.

In another preferred embodiment of a vehicle according to the invention oscillating arm has an at least substantially U-shaped cross-section at the location of its connection to joint part, wherein oscillating arm in a leg of U-shaped cross-section is provided with recess. Preferably, joint part in each leg of its U-shaped cross-section is provided with a laterally extending protrusion, wherein oscillating arm in each leg of its U-shaped cross-section is provided with a recess.

In another preferred embodiment of a vehicle in accordance with the invention protrusions mutually differ in height. In practice such a difference is height forms a very simple and elegant asymmetry in form of the joint part. Because of the fact that the recesses in its corresponding oscillating arm are shaped correspondingly, also the assymetric form of oscillating arm is as easy as elegant.

In another preferred embodiment of a vehicle according to the invention recess(es) has/have an open circumference.

In another preferred embodiment of a vehicle in accordance with the invention at least one joint part is attached to its corresponding connecting device by pivotally engaging protrusions of connecting device, at the location of pivot axis, in recesses provided in joint part. These protrusions that function as bearing surfaces are spaced far apart, so that the forces exerted thereon will be relatively low. Particularly, joint part has an at least substantially U-shaped cross-section at the location of its attachment to connecting device, wherein joint part in each leg of U-shaped cross-section is provided with a recess provided coaxially with pivot axis. More in particular, the protrusions extend outwards on either side of connecting device, wherein the protrusions are cylindrical. Even more in particular, the recesses are correspondingly shaped.

In another preferred embodiment of a vehicle according to the invention at least one oscillating arm has an at least substantially U-shaped cross-section at the location of the connection to its corresponding joint part, wherein hole is provided in a base of U-shaped cross-section. In addition thereto or in the alternative joint part comprises at least two lateral resilient tongues extending outwardly, wherein the oscillating arm has an at least substantially U-shaped cross-section at the location of its connection to joint part, and wherein each tongue engages in a correspondingly shaped hole provided in a leg of U-shaped cross-section. Preferably, hole(s) has/have a closed circumference. Such (a) closed hole(s) enhance(s) the retention of the connection device/joint part onto the oscillating arm in all possible directions, particularly both horizontally and vertically. In the alternative, hole(s) has/have a non-closed circumference.

The invention also relates to a windscreen wiper device as defined in a vehicle in accordance with the invention.

It is noted that in the present case joint part may have a resilient tongue as described in the aforesaid European patent publication no. 1 403 156 of the same Applicant. In the alternative, resilient tongue is forced in the outward position under the influence of a moment in case a force is exerted on the wiper blade in a direction away from the oscillating arm. Particularly, the counterforce exerted by the oscillating am on the resilient tongue engages at a point located behind the hinge axis, seen in the direction of the force exerted on the wiper blade. In other words, moment of force ensures in a natural way that the resilient tongue is forced automatically in its outward position, that is its position retaining the wiper blade onto the oscillating arm. On the contrary, in the above-mentioned European patent publication no. 1 403 156 of the same Applicant moment during use compels the resilient tongue to automatically take its inward position, thereby risking to have the wiper blade released from the oscillating arm, with all negative consequences. Preferably, in alternative case the hinge axis is located near an outer edge of joint part.

Furthermore, it is noted that joint part is made of plastic (including any synthetic material having some flexibility).

Finally, it is noted that the present invention is not restricted to the use with passenger cars, but it can also be used with trains and other fast vehicles.

THE DRAWINGS

The invention will now be explained in more detail with reference to figures illustrated in a drawing, wherein.

Figure 2:
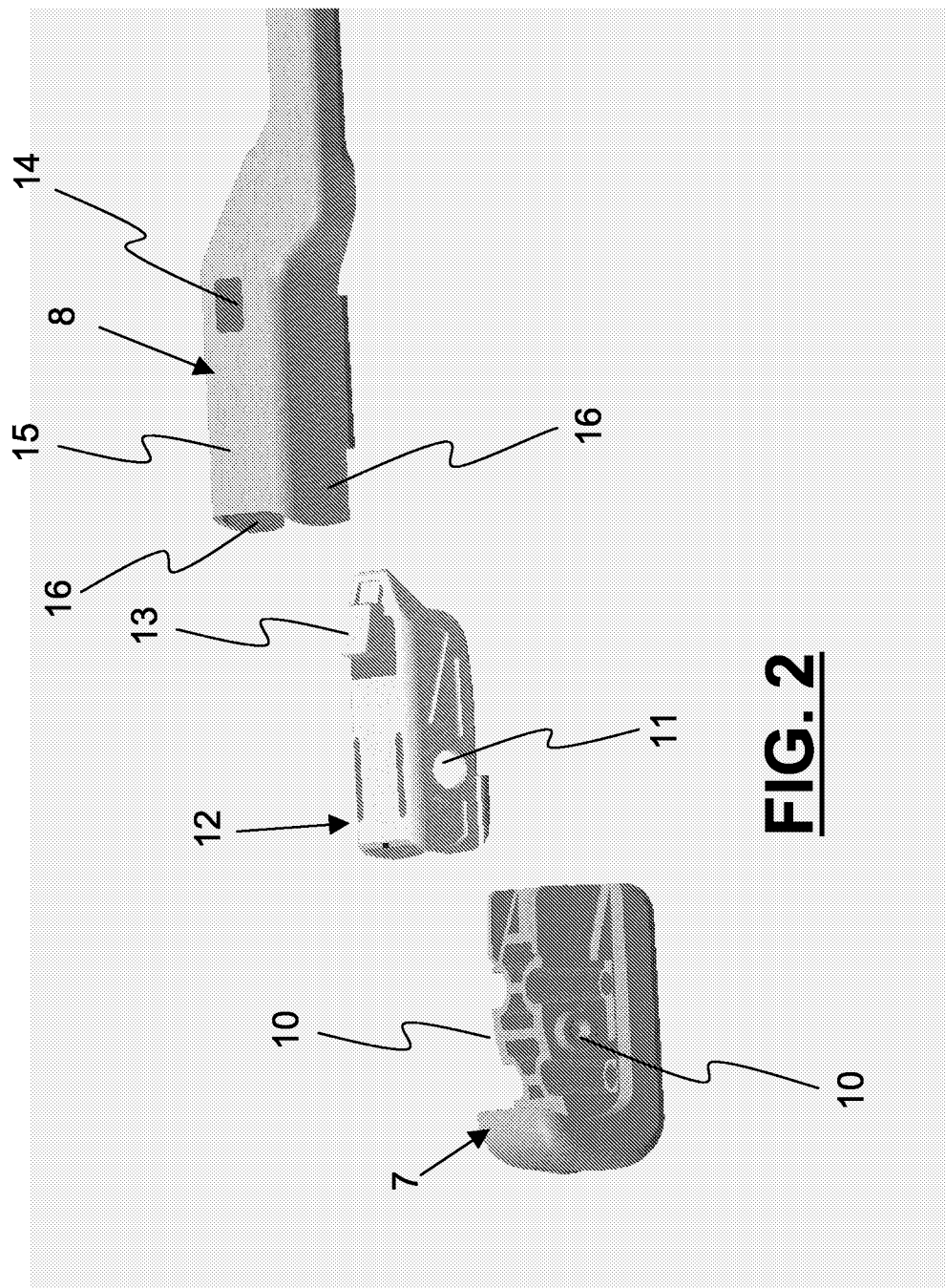
FIG. 2 is a perspective, schematic view of a connecting device as used in FIG. 1, as well as a joint part and (an end of) a oscillating arm according to another preferred embodiment in accordance with the invention.
Figure 3A:
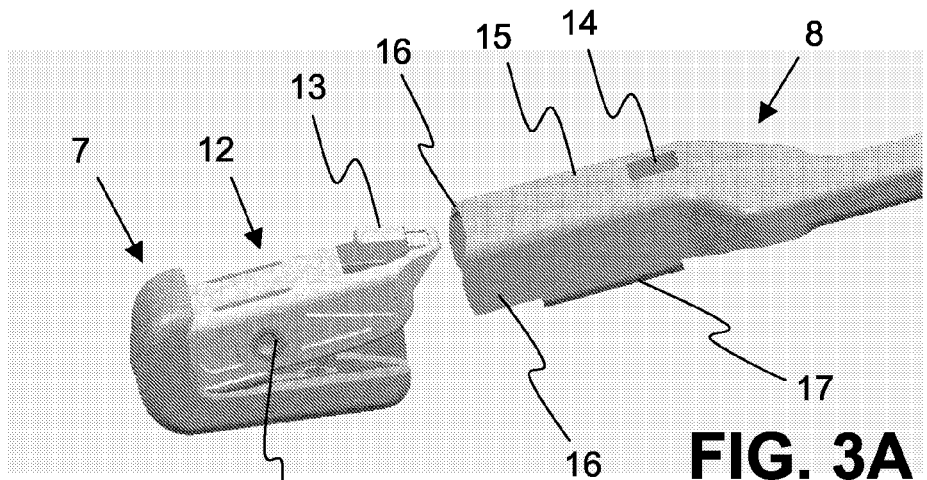
FIG. 3 shows various successive steps for fitting the connecting device, the joint part and the oscillating arm of FIG. 2 together.
Figure 3B:
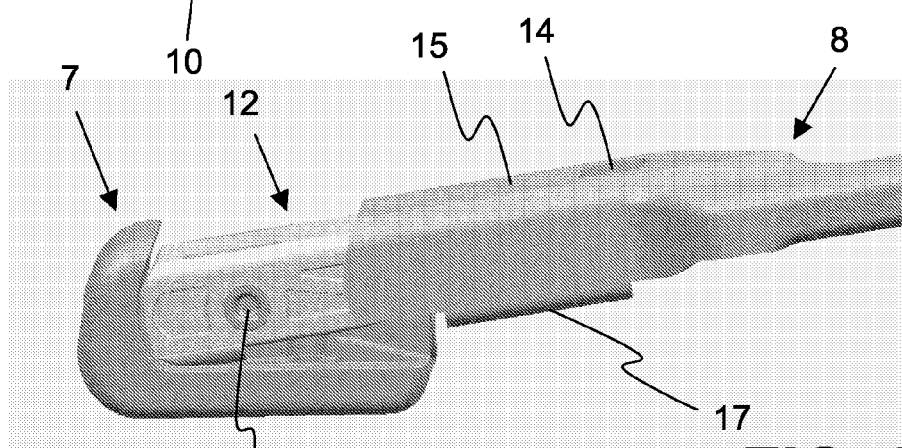
Figure 3C:
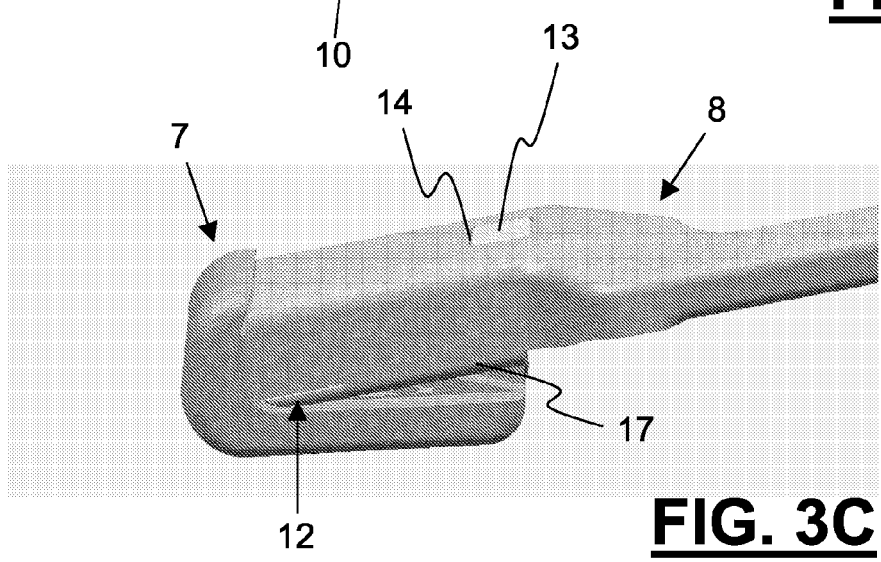
Figure 4:
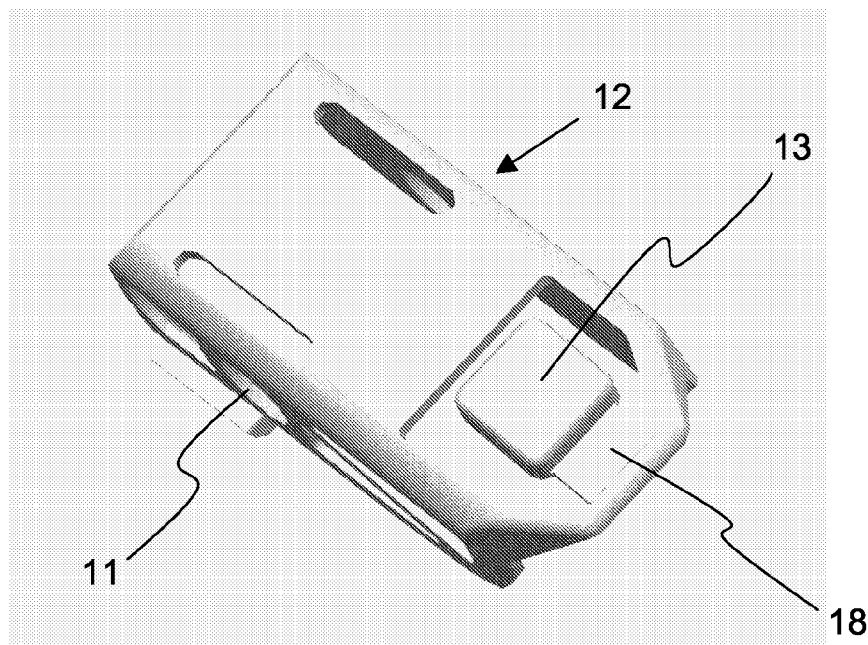
Figure 5:
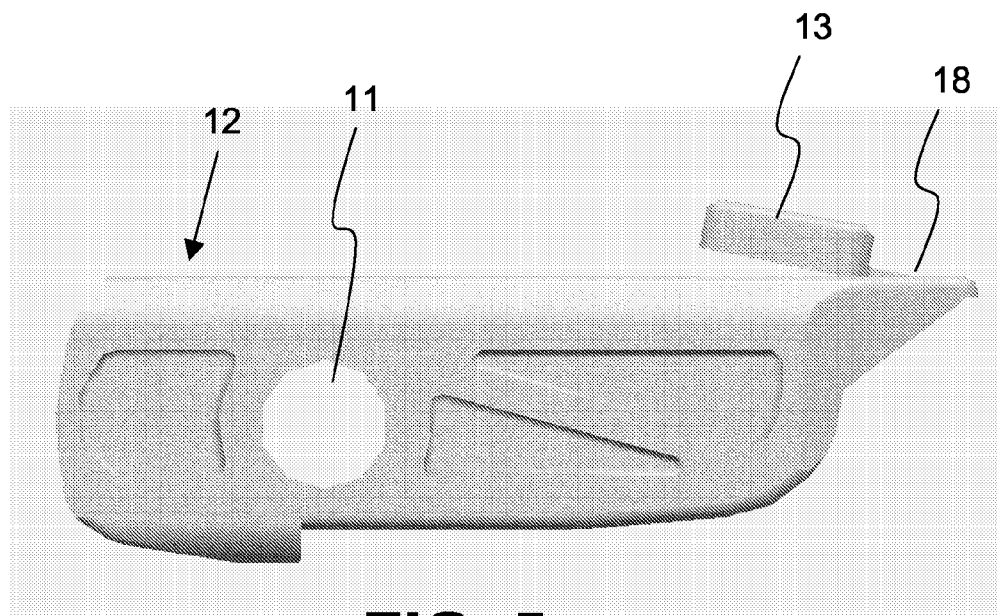

FIGS. 4 and 5 relate to several views of a joint part of FIGS. 2 and 3; and FIGS. 6 through 9 show the assymetric forms of the joint part and the oscillating arm realized by mutually cooperating protrusion/recess means in accordance with the invention.

DETAILED DESCRIPTION

Figure 1:
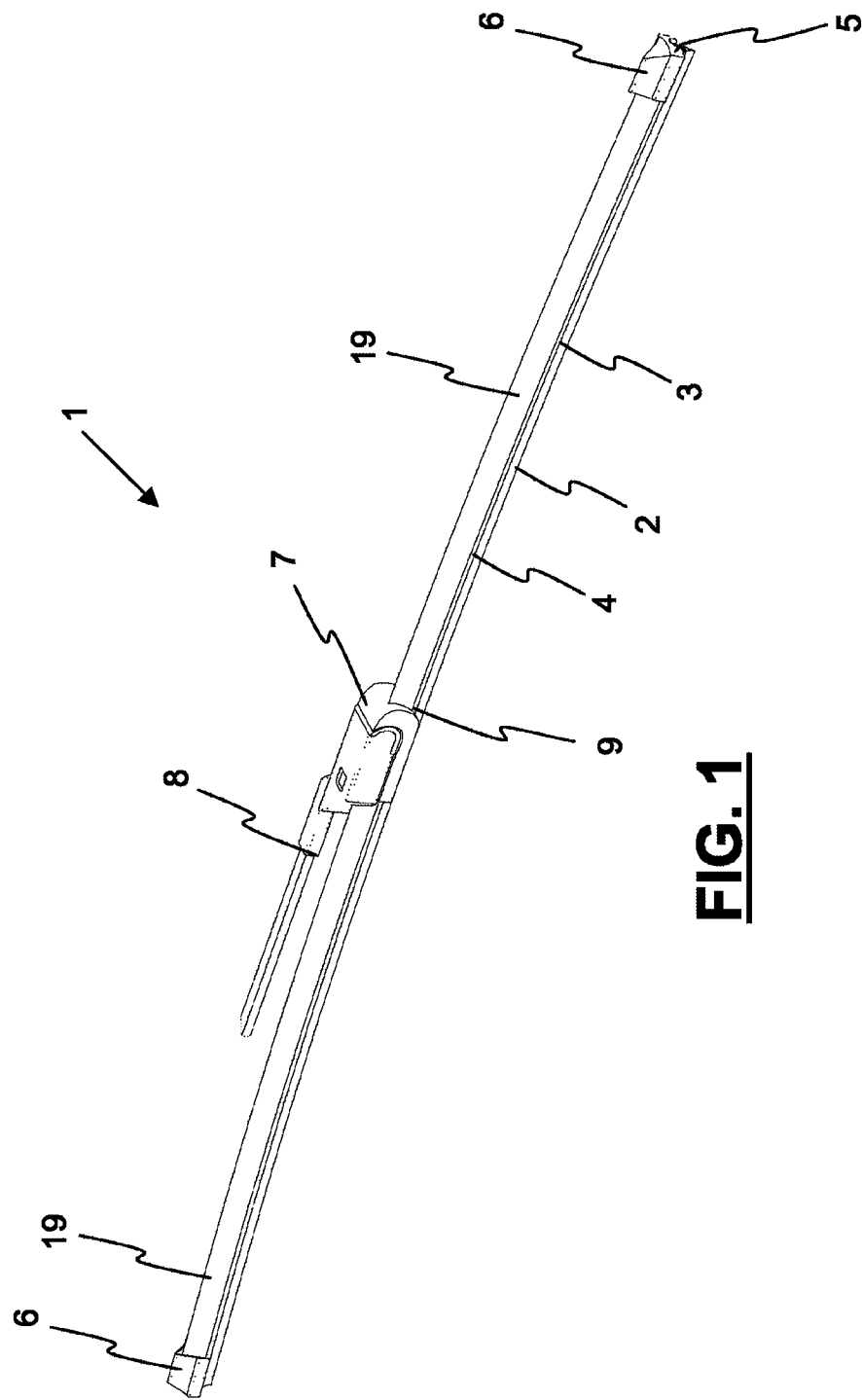
FIG. 1 is a perspective, schematic view of a preferred embodiment of a windscreen wiper device in accordance with the invention.

FIG. 1 shows a preferred variant of a windscreen wiper device 1 according to the invention. Windscreen wiper device 1 is built up of an elastomeric wiper blade 2, in the longitudinal sides of which opposing longitudinal grooves 3 are formed, and of longitudinal strips 4 made of spring band steel, which are fitted in said longitudinal grooves 3. Strips 4 form a flexible carrier element for the wiper blade 2, as it were, which is thus biased in a curved position (the curvature in operative position being that of a windscreen to be wiped). Neighbouring ends 5 of the strips 4 are interconnected on either side of the windscreen wiper device 1 by means of connecting pieces 6 functioning as clamping members. In this embodiment, the connecting pieces 6 are separate constructional elements, which may be formlocked ("a positive locking or having a positive fit") or force-locked to the ends 5 of the strips 4. In another preferred embodiment, connecting pieces 6 are in one piece with the strips 4 made of spring band steel. In the latter case connecting pieces 6 form transverse bridges for the strips 4, as it were.

The windscreen wiper device 1 is furthermore built up of a connecting device 7 of plastic material for an oscillating arm 8. Alternatively, the connecting device 7 may also be made of metal, such as steel or aluminum. The connecting device 7 comprises clamping members 9 that are integral therewith, which engage round longitudinal sides of the strips 4 that face away from each other, as a result of which the connecting device 7 is firmly attached to the unit consisting of the wiper blade 2 and the strips 4. The oscillating arm 8 is pivotally connected to the connecting device 7 about a pivot axis near one end, as will be described hereunder.

With reference to FIG. 2 the connecting device 7 comprises two cylindrical protrusions 10 extending outwards on either side of connecting device 7. These protrusions 10 pivotally engage in identically shaped cylindrical recesses 11 of a plastic joint part 12. In the alternative the recesses 11 may have a non-closed shape (i.e. open circumference). Protrusions 10 act as bearing surfaces at the location of a pivot axis in order to pivot the joint part 12 (and the oscillating arm 8 attached thereto) about pivot axis near one end of the oscillating arm 8. The protrusions 10 are preferably in one piece with the connecting device 7; in the alternative, the protrusions 10 are part of a single pivot pin perpendicular to the connecting device 7. Connecting device 7 may be equipped with a cover or cap in order to obtain an aesthetic appearance thereof, to avoid sharp edges and to provide protection against UV-light etcetera. The joint part 12 comprises one resilient tongue 13 extending outwardly, while the oscillating arm 8 has an U-shaped cross-section at the location of its connection to joint part 12, so that the tongue 13 engages in an identically shaped hole 14 provided in a base 15 of U-shaped cross-section.

FIG. 3 shows the steps of mounting the connecting device 7 with the wiper blade 2 (not shown) onto the oscillating arm 8. The joint part 12 being already clipped onto the connecting device 7 is pivoted relative to the connecting device 7, so that joint part 12 can be easily slid on a free end of the oscillating arm 8. During this sliding movement the resilient tongue 13 is initially pushed in against a spring force and then allowed to spring back into hole 14, thus snapping, that is clipping the resilient tongue 13 into the hole 14. This is a so-called bayonet-connection. The oscillating arm 8 together with the joint part 12 may then be pivoted back in a position parallel to the wiper blade 2 in order to be ready for use. By subsequently pushing in again resilient tongue 13 against the spring force (as if it were a push button), the connecting device 7 and the joint part 2 together with the wiper blade 2 (not shown) may be released from the oscillating arm 8. Dismounting the connecting device 7 with the wiper blade 2 (not shown) from the oscillating arm 8 is thus realized by sliding the connecting device 7 and the joint part 2 together with the wiper blade 2 (not shown) in a direction away from the oscillating arm 8.

Each leg 16 of the U-shaped cross-section of the oscillating arm 8 comprises clamping members formed as inwardly bended edges 17 integral with legs 16, wherein during use edges 17 engage round longitudinal sides of joint part 12 that face away from each other. Thus an enhanced retention of the connecting device 7/joint part 12 onto the oscillating arm 8 is achieved in vertical direction, that is perpendicular to the longitudinal direction of the oscillating arm 8.

FIGS. 4 and 5 relate to several views of a joint part of FIGS. 2 and 3. Resilient tongue 13 is rotatable along an hinge axis 18 (located near an outer edge of said joint part 12) between an outward position retaining the wiper blade 2 onto the oscillating arm 8 and an inward position releasing the wiper blade 2 from the oscillating arm 8. According to this embodiment of the invention resilient tongue 13 is forced in the outward position under the influence of a moment in case a force is exerted on the wiper blade 2 in a direction away from the oscillating arm 8. Particularly, the counterforce exerted by the oscillating arm 8 on the resilient tongue 13 engages at a point located behind the hinge axis 18, seen in the direction of the force exerted on the wiper blade 2. In other words, moment of force ensures in a natural way that the resilient tongue 13 is forced automatically in its outward position, that is its position retaining the connecting device 7, the joint part 12 and the wiper blade 2 (not shown) onto the oscillating arm 8.

An alternative for the joint part 12 shown in FIGS. 2 through 5 is depicted in FIG. 9, wherein corresponding parts are designated with the same reference numerals. In this alternative resilient tongue 13 is rotatable along a hinge axis 18 located near an inner edge of joint part 12.

As indicated earlier, during replacement of windscreen wiper devices as described in European patent publication no. 1 403 156 and as used in a vehicle with a so-called "butterfly" wiper arrangement, there is a risk that the windscreen wiper device to be mounted at the drivers side is actually mounted at the passengers side and that the windscreen wiper device to be arranged at the passengers side is actually mounted at the drivers side. This is detrimental for the wiping qualities when such windscreen wiper devices are equipped with spoilers. To obviate this disadvantage of "reverse" mounting, joint part 12 and the free end of the oscillating arm 8 are designed asymmetrically (seen in their respective vertical middle planes), as shown in FIGS. 6 through 9. Particularly, joint part 12 in each leg 19 of its U-shaped cross-section is provided with a laterally extending protrusion 20,21, while oscillating arm 8 in each leg 16 of its U-shaped cross-section is provided with a recess 22,23 having an open circumference. Protrusions 20,21 and thus recesses 22,23 mutually differ in height, so that both the joint part 12 and its corresponding oscillating arm 8 have an asymmetric form. More in particular, protrusion 20 having a height y cooperates with recess 22 having a same height y, while protrusion 21 with a height x cooperates with recess 23 with a same height x. Heights x and y mutually differ in the sense that x is smaller than y.

Preferably, a spoiler 19 is furthermore provided (FIG. 1).

The invention is not restricted to the variants shown in the drawing, but it also extends to other embodiments that fall within the scope of the appended claims.

The invention claimed is:

1. A vehicle provided with at least two windscreen wiper devices each comprising an elastic, elongated carrier element, as well as an elongated wiper blade of a flexible material, which can be placed in abutment with a windscreen of the vehicle to be wiped, each wiper blade including opposing longitudinal grooves on its longitudinal sides, in which grooves spaced-apart longitudinal strips of the carrier element are disposed, wherein neighboring ends of said longitudinal strips are interconnected by a respective connecting piece, which windscreen wiper devices each comprise a connecting device for a respective oscillating arm, wherein each oscillating arm is pivotally connected to its corresponding connecting device about a pivot axis near one end, with the interposition of a joint part, wherein each joint part comprises at least one resilient tongue engaging in a correspondingly shaped hole provided in its corresponding oscillating arm, and wherein said resilient tongue is rotatable along a hinge axis between an outward position retaining a wiper blade onto its corresponding oscillating arm and an inward position releasing said wiper blade from its corresponding oscillating arm, each joint part has an at least substantially U-shaped cross-section at the location of its attachment to its corresponding connecting device, and wherein each said joint part, in at least one leg of said U-shaped cross-section, is provided with at least one laterally extending protrusion and its corresponding oscillating arm has an at least substantially U-shaped cross-section at the location of its connection to said joint part, and wherein said corresponding oscillating arm, in at least one leg of said U-shaped cross-section, is provided with at least one recess for receipt of a corresponding one of said at least one laterally extending protrusion, wherein each said at least one protrusion on each said joint part have different heights and each said at least one recess in each oscillating arm have different heights resulting in an asymmetric form of each said joint part and of each said oscillating arm with respect to their respective middle longitudinal planes, seen in vertical direction, in order to ensure that each windscreen wiper device can only be mounted on its corresponding oscillating arm.

2. Vehicle according to claim 1, wherein each said joint part, in each leg of its U-shaped cross-section, is provided with said at least one laterally extending protrusion, and wherein said corresponding oscillating arm, in each leg of its U-shaped cross-section, is provided with said at least one recess.

3. Vehicle according to claim 1, wherein said at least one recess has an open circumference.

4. Vehicle according to claim 1, wherein at least one joint part is attached to its corresponding connecting device by pivotally engaging protrusions of said connecting device, at the location of said pivot axis, in recesses provided in said joint part.

5. Vehicle according to claim 1, wherein said hole is provided in a base of said U-shaped cross-section of said oscillating arm.

6. A plurality of windscreen wiper devices for wiping separate locations of a vehicle windscreen, each of said windscreen wiper devices comprising an elastic, elongated carrier element, as well as an elongated wiper blade of a flexible material, which can be placed in abutment with the windscreen, said windscreen wiper devices each comprising a connecting device for a respective oscillating arm in the separate locations of the vehicle windscreen, wherein each oscillating arm is pivotally connected to its corresponding connecting device about a pivot axis near one end, with the interposition of a joint part, wherein each joint part comprises at least one resilient tongue for cooperation with its corresponding oscillating arm to retain the wiper blade onto its corresponding oscillating arm and being moveable to a position for releasing said wiper blade from its corresponding oscillating arm, each joint part comprising at least one protrusion and its corresponding oscillating arm comprising at least one recess, each said at least one protrusion on each said joint part having different heights and each said at least one recess in each said oscillating arm having different heights resulting in an asymmetric form of each said joint part and of each said oscillating arm with respect to their respective middle longitudinal planes, seen in vertical direction, in order to ensure that each windscreen wiper device can only be mounted on its corresponding oscillating arm.

7. A replacement windscreen wiper for replacing an existing windscreen wiper on a vehicle, said replacement windscreen wiper comprising an elastic, elongated carrier element, as well as an elongated wiper blade of a flexible material, which can be placed in abutment with a vehicle windscreen, and a joint part configured for attachment to a connecting part of one of a plurality of oscillating arms on the vehicle, wherein the joint part comprises at least one resilient tongue to be clipped with its corresponding oscillating arm to retain said replacement windscreen wiper in attachment with its corresponding oscillating arm and being moveable to a position for releasing said replacement windscreen wiper from its corresponding oscillating arm, said joint part having a substantially U-shaped cross-section provided by a pair of legs spaced in generally parallel relation from one another with a base extending between said legs, said at least one resilient tongue movable on said joint part relative to each of said legs and said base, each of said legs having at least one protrusion extending laterally outwardly therefrom such that said at least one protrusion on one of said legs extends away from said at least one protrusion on the other of said legs, said at least one protrusion on one of said legs having a first height and said at least one protrusion on the other of said legs having a second height that is different from said first height, thereby resulting in an asymmetric form of said joint part with respect to its middle longitudinal plane, seen in vertical direction, in order to ensure that each replacement wiper can only be mounted on its corresponding oscillating arm and not another oscillating arms on the vehicle.

* * * * *